US006603958B1

(12) United States Patent
Gao et al.

(10) Patent No.: US 6,603,958 B1
(45) Date of Patent: Aug. 5, 2003

(54) METHOD AND APPARATUS FOR A CARRIER FREQUENCY CONTROL IN A WIRELESS COMMUNICATION SYSTEM

(75) Inventors: Shiwei Gao, Nepean (CA); Genzao G. Zhang, Vanier (CA); Kuang-Tsan Wu, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/500,458

(22) Filed: Feb. 9, 2000

(51) Int. Cl.$^7$ .................................. H04B 1/10
(52) U.S. Cl. ........................ 455/63; 455/119; 455/69
(58) Field of Search .......................... 455/255, 257–60, 455/266, 316, 119, 69

(56) References Cited

U.S. PATENT DOCUMENTS

| | | | | |
|---|---|---|---|---|
| 3,755,782 A | * | 8/1973 | Haas et al. | 340/10.2 |
| 4,670,889 A | * | 6/1987 | Hewitt | 370/482 |
| 4,868,850 A | | 9/1989 | Kaku et al. | 375/13 |
| 5,113,416 A | * | 5/1992 | Lindell | 375/344 |
| 5,245,611 A | * | 9/1993 | Ling et al. | 370/347 |
| 5,542,095 A | | 7/1996 | Petranovich | 455/183.2 |
| 5,563,888 A | * | 10/1996 | Parr et al. | 370/516 |
| 5,604,768 A | * | 2/1997 | Fulton | 370/350 |
| 5,794,119 A | | 8/1998 | Evans et al. | 455/6.2 |
| 5,909,640 A | * | 6/1999 | Farrer et al. | 455/63 |
| 6,240,556 B1 | * | 5/2001 | Evans et al. | 455/71 |

FOREIGN PATENT DOCUMENTS

WO  PCT/US95/16682  12/1995

* cited by examiner

Primary Examiner—Vivian Chin
Assistant Examiner—Sujatha Sharma

(57) ABSTRACT

The invention provides a frequency control method and apparatus for efficiently controlling in a wireless system the carrier frequency of a received signal transmitted over a radio link to counteract carrier frequency drifts in the received signal and hence maintain link connectivity. In a preferred embodiment, the invention provides upstream and downstream carrier frequency control in a broadband wireless access (BWA) time division multiplex access (TDMA) system formed of a base transceiver station (BTS) and multiple customer premises equipment (CPE) units. At each of the CPE units, the CPE upstream carrier frequency is preemptively adjusted based on downstream carrier frequency measurements to counteract carrier frequency variations in the upstream carrier frequency. For downstream communications, the BTS periodically polls all active CPE units to obtain downstream frequency offset estimates, calculate a frequency correction offset and adjust the downstream carrier frequency accordingly.

14 Claims, 6 Drawing Sheets

METHOD AND APPARATUS FOR A CARRIER FREQUENCY CONTROL IN A WIRELESS COMMUNICATION SYSTEM

FIELD OF THE INVENTION

The present invention relates to digital wireless communications systems and more particularly, to a method and apparatus for a carrier frequency control in such systems.

BACKGROUND OF THE INVENTION

Over the past few years, various wireless architectures have been developed in response to user demands for systems that can offer high-rate data communications. Recently for example, broadband wireless access (BWA) systems have become of interest to the wireless industry for their ability to supply high speed multimedia data services.

In a wireless communication system such as a BWA network, it is common to speak of a point-to-multipoint architecture. In this architecture, a base transceiver station (BTS), is positioned at the center of a service area (normally called a cell) and communicates over the air with multiple customer premises equipment (CPE) units located within the same cell. The BTS is usually fixed and designed for servicing all of the CPE units present in the cell. The CPE units can be designed to have fixed locations within the cell or alternatively be portable and free to roam.

Typically, the direction of communication from the BTS to the CPE units is called the downstream direction and the reverse direction of communication is referred to as the upstream direction. In order to send separate downstream data streams to multiple CPE units at the same time, the data is usually multiplexed. There is presently various multiplexing methods used for downstream communications. For example, downstream data is often transmitted by frequency division multiple access (FDMA) by assigning a distinct downstream carrier frequency to each CPE unit.

More commonly however, downstream data destined for several CPE units is multiplexed in time and transmitted at a common carrier frequency. This can also apply to upstream communications with upstream data originating from several CPE units multiplexed in time and transmitted at another common carrier frequency. A cellular system that has these characteristics is usually referred to as a time-division multiple access (TDMA) system.

In order to multiplex several data streams into a single TDMA stream, the time structure of an upstream communications link is divided into scheduling periods having a fixed number of time slots per scheduling period. The CPE units can only access the upstream link if an opportunity is granted in a scheduling period by the BTS. When an opportunity is given to a particular CPE unit to transmit on the upstream link, the CPE unit initially notifies the BTS of the amount of upstream bandwidth it requires for its transmission. This bandwidth on-demand process causes upstream transmissions to occur in bursts. The BTS receiver must be designed to operate rapidly and on a burst-by-burst basis for upstream transmissions to efficiently service each CPE unit present in the cell.

The upstream and downstream data is transmitted in dedicated high-frequency radio channels at radio frequencies (RF) which, in today's systems, typically range from a few gigahertz (GHz) up to 50 GHz. At each of the BTS and CPE units, local oscillators are used to generate carrier signals that can operate at these high frequencies so that data can be transmitted and/or received in the RF frequency range of interest.

An undesirable characteristic associated with the vast majority of conventional oscillators is that the carrier signals generated can be subject to frequency drifts which arise as a result of temperature changes and aging effects. The severity of the frequency drifts is directly proportional to the oscillating frequency and thus increases as the oscillating frequency increases. In wireless systems, because of the high frequency of operation, the frequency drifts introduced can be quite large, commonly in the order of hundreds of Kilohertz (KHz). Such large frequency drifts are difficult to track and can seriously affect the ability with which data can be reliably received.

A key aspect in maintaining a reliable radio link between CPE units and a BTS in a wireless system is the ability to counteract these carrier frequency variations. One possible way to address this problem is to increase the frequency stability of the local oscillators used. Unfortunately, this considerably increases design complexity in each of the BTS and CPE units and is often not economically sound.

Carrier recovery loops (CRLs) are commonly used in wireless systems to track and compensate small carrier frequency drifts. However, conventional CRL loops are not suited for large carrier frequency variations which, as noted above, are inevitable at high carrier frequencies. As is well known, large frequency drifts in a carrier can easily cause upstream and downstream transmissions to fall outside the carrier acquisition range of a conventional CRL loop and potentially result in link failures.

In a traditional point-to-point wireless system, it is known to use CRL loops equipped with frequency sweep capabilities (hereinafter also referred to as a frequency sweep CRL loop). The use of a frequency sweep control in a CRL loop is highly desirable because it increases the CRL loop carrier acquisition range and allows tracking of larger carrier frequency drifts.

However, despite this important advantage, the use of a frequency sweep mechanism in a CRL loop unfortunately reduces the speed at which the CRL loop can perform carrier acquisitions. In some receivers such as CPE receivers for example, a slow carrier acquisition speed may be tolerable because the carrier signal to acquire is continuous and thus available for a complete acquisition. In other types of receivers however, where the carrier signal received is instead formed of discontinuous bursts, a frequency sweep CRL loop may simply not be fast enough.

In a BTS receiver for example, a frequency sweep CRL loop would not be capable of providing carrier acquisitions sufficiently rapidly for receiving upstream signals transmitted in bursts from different CPE units. In current wireless systems, upstream signals are typically transmitted in bursts of varying sizes and duration where each burst is from a different CPE unit. For each signal burst of upstream data received, the BTS receiver only has available a very short period of time to perform a complete carrier acquisition before it can begin to receive the data transmitted. This is particularly true for upstream bursts of a short duration where a short acquisition time is critical for reliable data reception.

Because of their slow carrier acquisition speed, frequency sweep CRL loops simply cannot perform carrier acquisitions sufficiently quickly. Therefore, it would be desirable to provide a carrier frequency compensation scheme at the BTS which is capable of fast burst-to-burst carrier acquisitions and capable of counteracting potentially large carrier frequency drifts in each signal burst received from every CPE unit present in a cell.

SUMMARY OF THE INVENTION

The invention provides a carrier frequency control method and apparatus for efficiently controlling in a wireless system the carrier frequency of a received signal transmitted over a radio link to counteract carrier frequency drifts in the received signal and maintain link connectivity.

In a preferred embodiment, the invention provides upstream and downstream carrier frequency control in a broadband wireless access (BWA) time division multiplex access (TDMA) system formed of a base transceiver station (BTS) and multiple customer premises equipment (CPE) units.

The upstream carrier frequency control in each CPE unit is based on estimates of downstream carrier variations in the downstream carrier signal received therein. More specifically, after a successful acquisition of the downstream carrier signal received, each CPE unit estimates a downstream carrier frequency offset between the downstream carrier signal frequency received and an expected downstream carrier signal frequency. Based on the downstream carrier frequency offset estimated, each CPE unit preemptively adjusts its respective upstream carrier frequency. By preemptively adjusting the CPE upstream carrier frequency at each CPE unit, variations in the upstream carrier frequency subsequently appearing in the upstream data as a result of frequency conversions to and from radio frequencies are efficiently counteracted.

According to the invention, any residual offset not cancelled by preemptive offsetting of the upstream carrier frequency can be advantageously handled by a conventional carrier recovery loop (CRL) at the BTS.

Another advantage is that the preemptive offsetting of the upstream carrier frequency at each CPE unit ensures that the BTS can in fact receive upstream signals more reliably. This in turn considerably improves upstream carrier acquisition performance at the BTS.

Similarly to the upstream carrier frequency control, the downstream carrier frequency control at the BTS is also based on estimates of downstream carrier variations in the downstream carrier signal received at the CPE units. In the preferred embodiment, the BTS periodically polls all active CPE units to obtain downstream frequency offset estimates. In each polling period, the BTS calculates a frequency correction offset based on the estimates received and adjusts its downstream carrier frequency accordingly. The downstream carrier frequency adjustment advantageously compensates carrier frequency variations caused locally within the BTS and considerably improves downstream carrier acquisition performance at each CPE unit.

BRIEF DESCRIPTION OF THE DRAWINGS

These and other aspects and features of the present invention will become apparent to those of ordinary skill in the art upon review of the following description of specific embodiments of the invention in conjunction with the accompanying drawings, in which.

DETAILED DESCRIPTION OF THE PREFERRED EMBODIMENTS

The invention provides a signal frequency control method and apparatus for efficiently controlling in a wireless system the carrier frequency of a received signal so as to counteract carrier frequency drifts and maintain link reliability. Generally, the invention can be used in any wireless system to control the carrier frequency of any signal received at a receiving terminal from a transmitting terminal. In a preferred embodiment, the invention is incorporated in a broadband wireless access (BWA) time division multiplex access (TDMA) system to provide upstream and downstream carrier frequency control between multiple customer premises equipment (CPE) units and a base transceiver station (BTS).

Figure 1:
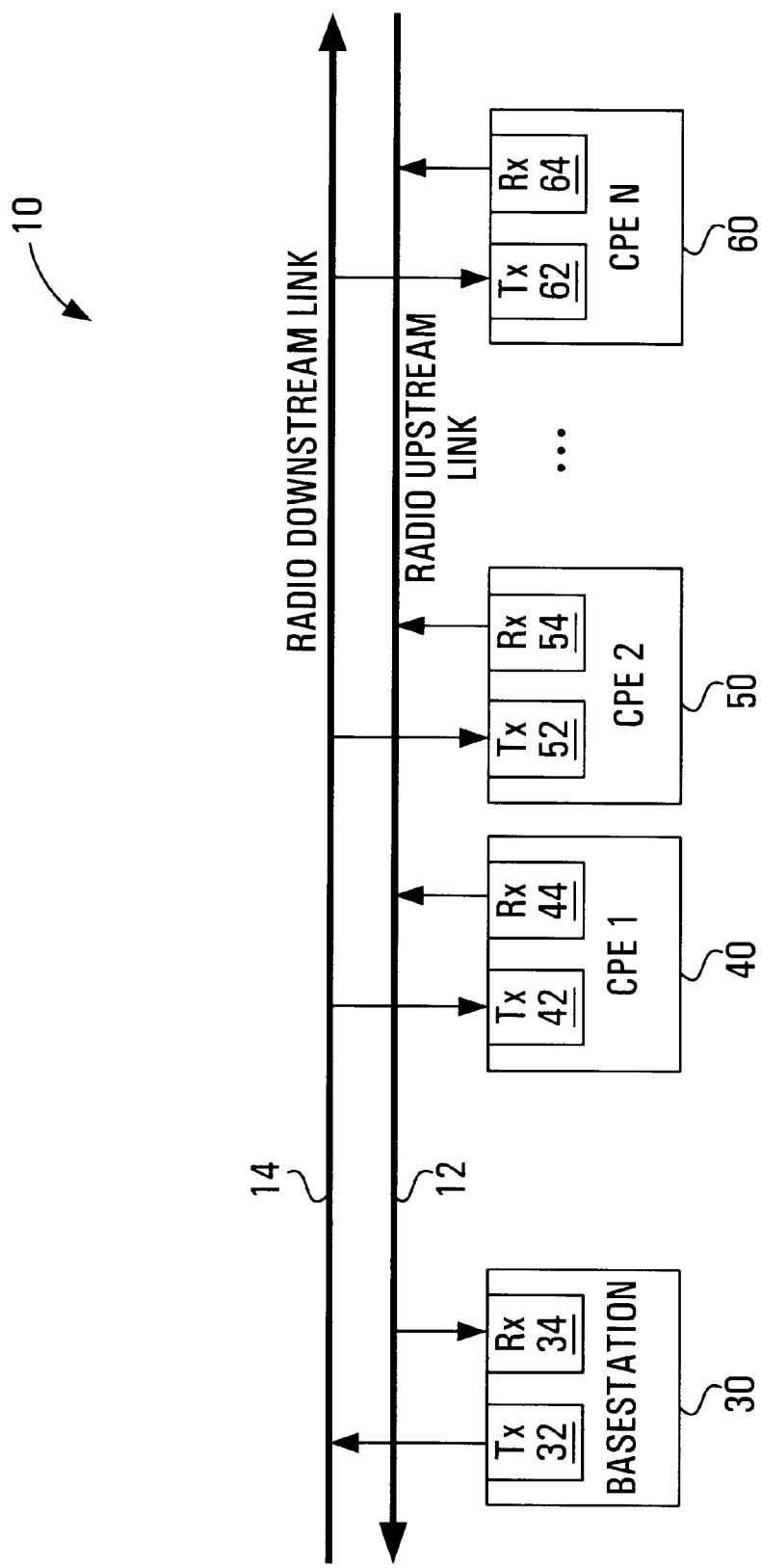
FIG. 1 is a block diagram of a typical broadband wireless access (BWA) time-division multiple access (TDMA) network featuring a base transceiver station (BTS) and multiple customer premises equipment (CPE) units.

Referring firstly to FIG. 1, there is illustrated a block diagram of a BWA TDMA network generally indicated by 10. The BWA TDMA network 10 consists of a BTS 30 connected to a plurality N of CPE units 40, 50, 60 (only three shown) via an upstream radio frequency link 12 and a downstream radio link 14. For downstream communications, the BTS 30 has a transmitter 32 operable to transmit downstream data over the downstream radio link 14. At each of the CPE units 40, 50, 60, a receiver 44, 54, 64 is tuned to receive the downstream data transmitted by the BTS 30. Similarly, for upstream communications, the CPE units 40, 50, 60 have a respective transmitter 42, 52, 62 operable to transmit upstream data over the upstream radio link 12. At the BTS 30, a receiver 34 can receive the upstream data transmitted from the CPE units 40, 50, 60.

For clarity, the BTS 30 and each of the CPE units 40, 50, and 60 are shown with separate transmitter and receiver units. It is to be understood that components such as for example RF components may be shared between transmitting and receiving ends of the BTS 30 and the CPE units 40, 50, 60 to reduce cost and/or simplify design. In some configurations, the transmitting and receiving ends may also be designed as a single transceiver that combines both the transmitting and receiving functions. In the following description, it is assumed that the transmitter and receiver units at the BTS 30 and each of the CPE units 40, 50, 60 are separate entities sharing a common RF front end.

In the BWA TDMA network 10, upstream and downstream data is transmitted at radio frequencies (RF) ranging from a few gigahertz (GHz) up to 50 GHz. As is conventional for any RF transmission system, local oscillators are used at each of the BTS and CPE units 40, 50, 60 to generate RF carrier signals for up-converting and down-converting data to and from RF frequencies.

Figure 2:
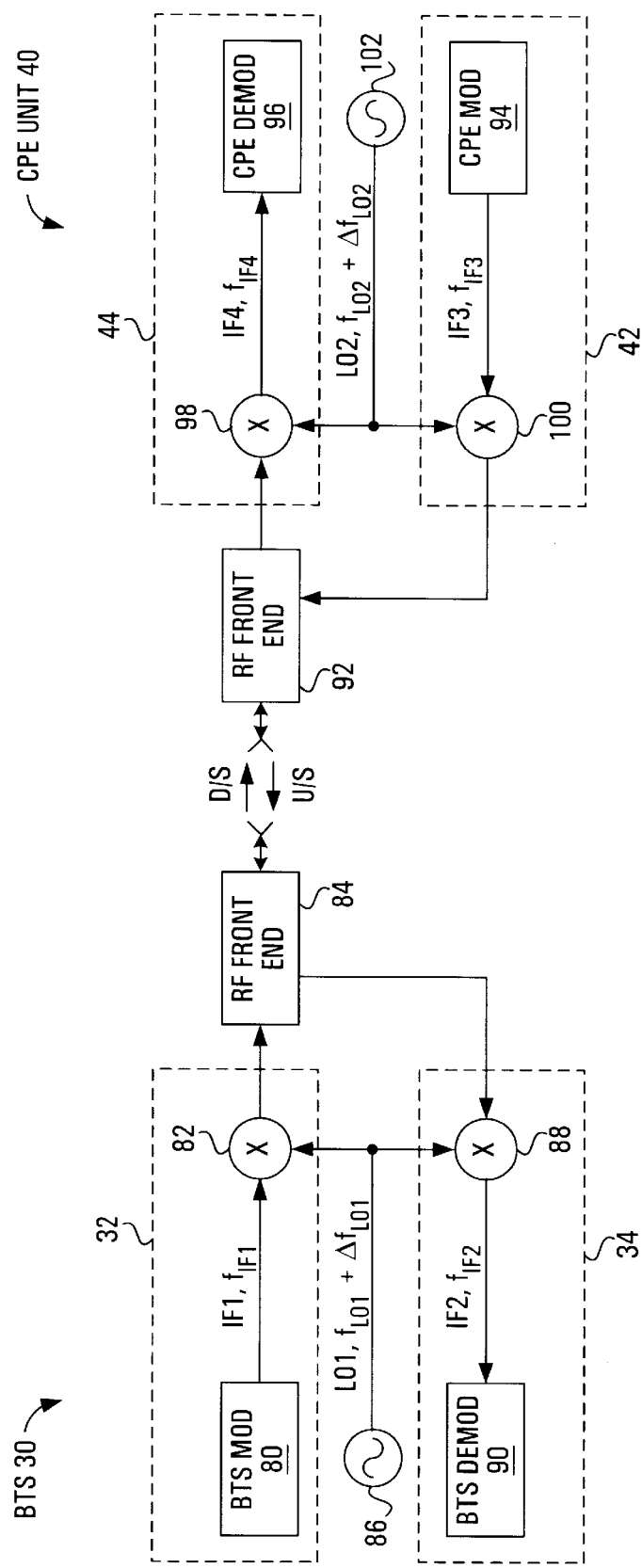
FIG. 2 is a more detailed diagram of the BTS and one CPE unit of FIG. 1 illustrating in particular the local oscillators used for intermediate frequency-radio frequency (IF-RF) and RF-IF conversions.

Typically at each of the BTS 30 and CPE units 40, 50, 60, the same oscillator is used for both up-conversion and down-conversion operations. FIG. 2 which illustrates the BTS 30 and the CPE unit 40 in more detail shows an example where a single oscillator 86, 102 is used at each of the BTS 30 and the CPE unit 40 for both RF up-conversions and down-conversions.

In the BTS 30, the oscillator 86 is used to up-convert downstream data and down-convert upstream data to and from a common RF front end 84. On the transmit side, the downstream data is produced by a BTS modulator 80 located within the BTS transmitter 32. The BTS modulator 80 produces an IF signal IF1 which contains downstream data modulated at a particular IF carrier frequency $f_{IF1}$. The IF signal IF1 is fed into a mixer 82 which together with the oscillator 86, up-converts the downstream data to RF frequencies so that it can be transmitted by the RF front end 84.

On the receive side, the upstream data received by the RF front end 84 is fed into another mixer 88. This mixer 88 together with the local oscillator 86 down-converts the upstream data received and produces an IF signal IF2 carrying the upstream data modulated at another IF carrier frequency $f_{IF2}$. The IF signal IF2 is formed of discontinuous signal bursts where each signal burst carries a particular burst of upstream data transmitted from a particular CPE unit 40, 50, 60. It is to be noted that although the IF frequencies $f_{IF1}$ and $f_{IF2}$ at which the downstream and upstream data is respectively modulated are denoted as distinct frequencies, these frequencies can also be substantially the same. For clarity and for the purpose of example, the IF frequencies $f_{IF1}$ and $f_{IF2}$ are hereinafter assumed to be different frequencies.

In order to up-convert downstream data and down-convert upstream data to and from RF frequencies, the oscillator 86 used within the BTS 30 generates a single carrier signal LO1 at a frequency $f_{LO1}$. Therefore, on the transmit side, the carrier signal LO1 is fed into the product modulator 82 to up-convert the IF signal IF1 carrying downstream data to RF frequencies so that it can be transmitted by the RF front end 84. Similarly, on the receive side, the same carrier signal LO1 is used within the other product modulator 88 to down-convert upstream data received from the RF front end 84 and produce the IF signal IF2 at the IF carrier frequency $f_{IF2}$. As with most conventional oscillators, the carrier signal LO1 generated by the oscillator 86 is subject to a certain frequency offset $\Delta f_{LO1}$ which can be caused for example by temperature changes and aging effects (further details below). The effective signal frequency of the carrier signal LO1 can hence be expressed as $f_{LO1} + \Delta f_{LO1}$.

At the CPE unit 40, the oscillator 102 is used to up-convert upstream data and down-convert downstream data to and from a common RF front end 92. On the transmit side, the upstream data is produced by a CPE modulator 94 located within the CPE transmitter 42. The CPE modulator 94 produces an IF signal IF3 which contains downstream data modulated at a particular IF carrier frequency $f_{IF3}$. The IF signal IF3 is fed into a mixer 100 which together with the oscillator 106, up-converts the upstream data to RF frequencies so that it can be transmitted by the RF front end 92.

On the receive side, the downstream data received by the RF front end 92 is fed into another mixer 98. This mixer 98 together with the local oscillator 102 down-converts the downstream data received to produce an IF signal IF4 carrying the downstream data modulated at another IF carrier frequency $f_{IF4}$. From the mixer 98, the IF signal IF4 is fed into a CPE demodulator 96 which forms part of the CPE receiver 44. In contrast to the IF signal IF2, the IF signal IF4 is continuous. Again, the IF frequencies $f_{IF3}$ and $f_{IF4}$ are denoted as distinct frequencies but could also be substantially the same. For clarity and for the purpose of example, the IF frequencies $f_{IF3}$ and $f_{IF4}$ are hereinafter assumed to be different frequencies.

Similarly to the oscillator 86, the oscillator 102 used in the CPE unit 40 also produces a single carrier signal LO2 of frequency $f_{LO2} + \Delta f_{LO2}$ to up-convert upstream data and down-convert downstream data to and from RF frequencies. Therefore, on the transmit side, the carrier signal LO2 is fed into the mixer 100 to up-convert the IF signal IF3 carrying upstream data to RF frequencies so that it can be transmitted by the RF front end 92. Similarly, on the receive side, the same carrier signal LO2 is used within the mixer 98 to down-convert downstream data received from the RF front end 92 and produce the IF signal IF4 at the IF carrier frequency $f_{IF4}$.

As is conventional, some filtering may be required in the BTS 30 and the CPE unit 40 to successfully process upstream and downstream data after an up-conversion or down-conversion. For example, before any RF transmission, filtering may be required after up-converting downstream data in the mixer 82 or upstream data in the mixer 100. In this particular example, a filtering function could be implemented in each of the RF front ends 84, 92 for this purpose. Similarly, filtering may be required after down-converting upstream data in the mixer 88 or downstream data in the mixer 98 prior to any demodulation. Again, a filtering function could be implemented inside the BTS and CPE demodulators for this purpose. In FIG. 2, this filtering is omitted for clarity.

Considering the IF-RF frequency conversions more specifically, at the BTS 30 the downstream data is up-converted from the IF carrier frequency $f_{IF1}$ to a RF carrier frequency $f_{RFd/s}$ for RF transmission over the downstream radio link 14. Similarly, at the CPE unit 40, the upstream data is up-converted from the IF carrier frequency $f_{IF3}$ to another RF carrier frequency $f_{RFu/s}$ for transmission over the upstream link 14. The RF carrier frequencies $f_{RFd/s}$ and $f_{RFu/s}$ are a respective function of the carrier frequencies $f_{LO1}$ and $f_{LO2}$ used at the BTS 30 and the CPE unit 40. The frequency relationships between $f_{RFd/s}$ and $f_{LO1}$ and between $f_{RFu/s}$ and $f_{LO2}$ can be expressed, for the purpose of example, as follows:

$$f_{RFd/s} = f_{LO1} + \Delta f_{LO1} - f_{IF1}; \text{ and}$$

$$f_{RFu/s} = f_{LO2} + \Delta f_{LO2} + f_{IF3}$$

where, as noted above, $\Delta f_{LO1}$ and $\Delta f_{LO2}$ represent frequency offsets present in the carrier signals LO1 and LO2 respectively.

Considering the RF-IF frequency conversions more specifically, it will be recalled that at the CPE unit 40, the downstream data received is down-converted from the RF carrier frequency $f_{RFd/s}$ to the IF carrier frequency $f_{IF4}$. Similarly, at the BTS 30, the upstream data received is down-converted from the RF carrier frequency $f_{RFu/s}$ to the IF carrier frequency $f_{IF2}$. Based on the above expressions for the RF carrier frequencies $f_{RFd/s}$, $f_{RFu/s}$, the IF carrier frequencies $f_{IF2}$, $f_{IF4}$ to which the downstream and upstream data streams are down-converted can be established.

Considering first the RF-IF frequency conversion of downstream data in the CPE unit 40, it can be shown that the IF carrier frequency $f_{IF4}$ of the IF carrier signal IF4 can be expressed as:

$$f_{IF4} = f_{LO2} + \Delta f_{LO2} - f_{RFd/s}$$

Substituting $(f_{LO1}+\Delta f_{LO1}-f_{IF1})$ for $f_{RFd/s}$, the above expression for $f_{IF4}$ can be reformulated as:

$$f_{IF4}=f_{LO2}+\Delta f_{LO2}-(f_{LO1}+\Delta f_{LO1}-f_{IF1}); \text{ or}$$

$$f_{IF4}=f_{d/s}+\Delta f_{d/s}$$

where $f_{d/s}=(f_{LO2}-f_{LO1}+f_{IF1})$ is the nominal or expected downstream IF carrier frequency of the IF carrier signal IF4 and $\Delta f_{d/s}=\Delta f_{LO2}-\Delta f_{LO1}$ is the downstream frequency offset present in the IF carrier signal IF4.

Similarly, with respect to the RF-IF frequency conversion of upstream data at the BTS 30, it can be shown that the IF carrier frequency $f_{IF2}$ of the IF carrier signal IF2 can be expressed as:

$$f_{IF2}=f_{RFu/s}-(f_{LO1}+\Delta f_{LO1})$$

With $(f_{LO2}+\Delta f_{LO2}+f_{IF3})$ substituted for $f_{RFu/s}$, the above expression for $f_{IF2}$ can be re-formulated as:

$$f_{IF2}=f_{LO2}+\Delta f_{LO2}+f_{IF3}-(f_{LO1}+\Delta f_{LO1}); \text{ or}$$

$$f_{IF2}=f_{u/s}+\Delta f_{u/s}$$

where $f_{u/s}=(f_{LO2}+f_{IF3}-f_{LO1})$ is the nominal or expected upstream IF carrier frequency of the IF carrier signal IF2 and $\Delta f_{u/s}=\Delta f_{LO2}-\Delta f_{LO1}$ is the upstream frequency offset present in the IF carrier signal IF2.

From the above expressions, it can be observed that because the same oscillators 86, 102 are used for both upstream and downstream data, the upstream frequency offset $\Delta f_{u/s}$ is substantially identical to the downstream frequency offset $\Delta f_{d/s}$. Therefore, upstream and downstream transmissions between the BTS 30 and the CPE unit 40 are subject to substantially the same frequency variations. This is of course also true of transmissions between the BTS 30 and other CPE units 50, 60 in the network 10.

Considering in particular the BTS 30 and the CPE unit 40, the severity of the frequency drifts $\Delta f_{u/s}$, $\Delta f_{d/s}$ is directly proportional to the oscillating frequency of each particular oscillator 86, 102. As the oscillating frequency of each oscillator 86, 102 increases, so will the frequency drifts $\Delta f_{u/s}$, $\Delta f_{d/s}$.

In the BTS 30 and the CPE unit 40, the oscillators 86, 102 must operate at high frequencies to transmit data at RF frequencies. Because of the high frequency of operation, the frequency drifts $\Delta f_{u/s}$, $\Delta f_{d/s}$ introduced in the upstream and downstream data can be quite large. More specifically, because the upstream and downstream data is transmitted at RF frequencies from a few GHz up to 50 GHz, the oscillators 86, 102 will typically introduce frequency offsets in the order of hundreds of Kilohertz (kHz). Unfortunately however, these large frequency offsets can reduce the ability with which data can be reliably received and thus have a serious impact on upstream and downstream link performance. This is particularly true at power up or after a reset condition where large frequency offsets may considerably reduce upstream and downstream carrier acquisition performance at both the BTS 30 and the CPE unit 40.

Figure 3:
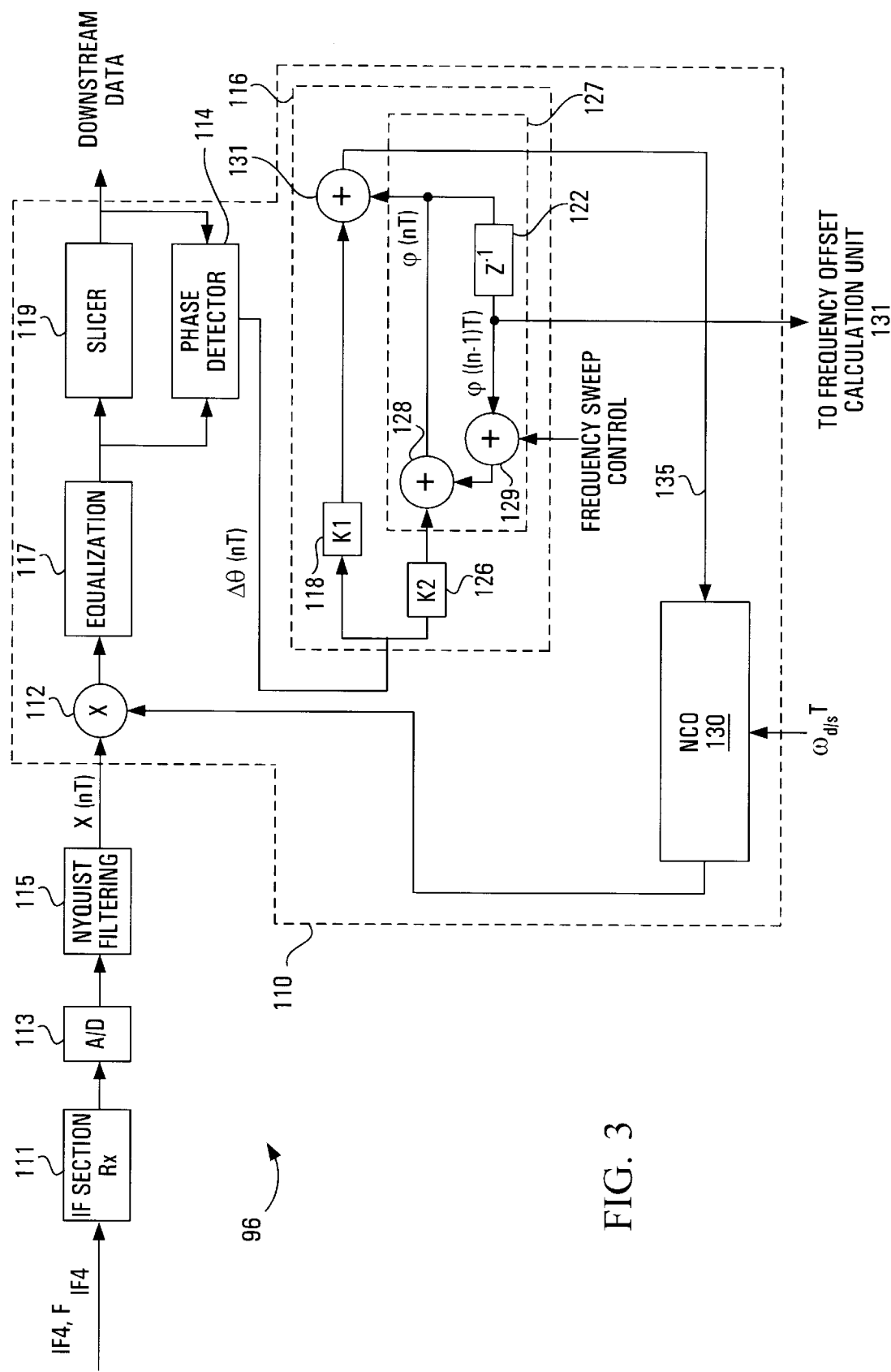
FIG. 3 is a block diagram of the CPE demodulator of the CPE unit of FIG. 2.

With respect to downstream transmissions, conventional frequency sweep carrier recovery loops (CRLs) can be used at the IF stage to compensate for the downstream carrier frequency variations. At the CPE unit 40 for example, the downstream frequency offset $\Delta f_{d/s}$ can be tracked by a conventional CRL equipped with proper frequency sweep control. FIG. 3 shows an example of a frequency sweep CRL loop generally indicated by 110 which can be used within the CPE demodulator 96 to track the downstream carrier frequency offset $\Delta f_{d/s}$ present in the IF carrier signal IF4.

As is conventional, the CPE demodulator 96 includes an IF section receiver 111, an analog-to-digital (A/D) converter 113 and a Nyquist filtering block 115 connected in series with the frequency sweep CRL loop 110. Before being fed into the loop 110, the IF carrier signal IF4 is first digitized in the A/D converter 113 and filtered in the Nyquist filtering block 115. For the purpose of example, the digitized and filtered IF carrier signal IF4 as output by the Nyquist filtering block 115 and input to the loop 110 is denoted by X(nT) and can be expressed in a complex form as follows:

$$x(nT)=a(nT)\cdot e^{j\{\omega_{d/s}nT+\Delta\omega_{d/s}nT+\phi(nT)\}}+v(nT)$$

where n is an integer, T is the sampling period, $\omega_{d/s}$ is the nominal IF carrier frequency of the IF carrier signal IF4 in radian ($\omega_{d/s}=2\pi f_{d/s}$), $\Delta\omega_{d/s}$ is the downstream frequency offset in radian ($\Delta\omega_{d/s}=2\pi\Delta f_{d/s}$), a(nT) and $\phi$(nT) are the IF carrier signal IF4 instant amplitude and phase respectively, and v(nT) represents digitized noise.

The loop 110 shown in this figure consists of a number of components connected in series. These components include a mixer 112, an equalization unit 117, a slicer 119, a phase detector 114, a second-order loop filter generally indicated by 116 and a numerical controlled oscillator (NCO) 130. More specifically, the mixer is coupled to receive both the loop input signal X(nT) and the output of the NCO 130. As is conventional, the output of the mixer is passed through the equalization unit 117 and then fed into the slicer 119 to produce a digital signal that contains the demodulated downstream data.

The phase detector 114 is coupled to receive both input and output of the slicer 119 to produce an output $\Delta\theta$(nT) which consists of a phase error between the loop input X(nT) and the NCO output. The phase error output $\Delta\theta$(nT) produced by the phase detector 114 is passed through the loop filter 116 to remove instant phase fluctuations and noise present therein.

The loop filter 116 has a pair of scaling units 118, 126 each connected to scale the amplitude of the phase error output $\Delta\theta$(nT) by a respective scaling factor K1, K2. The K2 scaling unit 126 is connected to an integrator generally indicated by 127. Within the integrator 127, a first adder 128 is connected with a delay unit 122 in a loop to combine the K2 scaled phase error $\Delta\theta$(nT) with a delayed version of itself. The output of the adder 128 is representative of the phase offset caused by the downstream frequency offset $\Delta f_{d/s}$ and can be viewed as a filtered phase error $\phi$(nT). The output of the delay unit 122 which is also representative of the phase offset caused by the downstream frequency offset $\Delta f_{d/s}$ can be viewed as a delayed version $\phi((n-1)T)$ of the filtered phase error $\phi$(nT). A second adder 129 connected in series between the first adder 128 and the delay unit 122 is used to provide frequency sweep control for increasing the carrier acquisition range of the CRL loop 110.

The phase error $\phi$(nT) is added to the K1 scaled phase error $\Delta\theta$(nT) in an adder 131 to form a loop output signal 135 which is used to drive the NCO 130. Based on the loop filter output signal 135, the NCO 130 generates its output which, after successful downstream carrier acquisition, has the same frequency as the loop input X(nT).

Therefore, with the CRL loop 110, the CPE unit 40 and more specifically the CPE demodulator 96 can track potentially large downstream carrier frequency variations in the downstream data and acquire the downstream carrier frequency used by the BTS 30. As with other conventional CRL loops designed with a frequency sweep however, a major disadvantage of the CRL loop 110 is its inherently slow carrier acquisition speed. In the CPE unit 40, a slow carrier acquisition speed may be tolerated because the downstream carrier signal to acquire (IF4 or more specifically X(nT)) is continuous and thus available for a complete carrier acquisition.

At the BTS 30 however, the IF carrier signal IF2 is, as noted above, discontinuous and received in bursts where each burst carries a particular burst of upstream data transmitted from a particular CPE unit 40, 50, 60. Because upstream signals are transmitted in bursts, the BTS 30 only has available a short period of time to perform a carrier acquisition for each signal burst received, particularly for bursts of short duration.

According to the invention, at each CPE unit 40, 50, 60, the downstream frequency offset present in the downstream data is estimated and subtracted from the CPE upstream IF carrier frequency used for upstream transmissions. It will be recalled that between the BTS 30 and each CPE unit 40, 50, 60, the downstream frequency offset is substantially equal to the upstream frequency offset. By subtracting the estimated downstream frequency offset, the CPE upstream IF carrier frequency used at each CPE unit 40, 50, 60 is preemptively offset by an amount substantially equal to the upstream frequency offset introduced thereafter in the upstream data.

Therefore, by preemptively offsetting the CPE upstream IF carrier frequency used at each CPE unit 40, 50, 60, the upstream frequency offset observed at the input of the BTS demodulator 90 is considerably reduced. With substantially no upstream carrier frequency variations in the upstream data, the carrier acquisition of upstream signals within the BTS demodulator 90 can be considerably accelerated and performed on a burst-to-burst basis. This in turn ensures that upstream data can be reliably demodulated and retrieved.

In reality, there might be residual upstream frequency variations at the input of the BTS demodulator 90 due for example to frequency estimation errors in the CPE units 40, 50, 60 or frequency drifts in the IF stages. According to the invention, any residual offset not cancelled by preemptive offsetting of the CPE upstream IF carrier frequencies is small enough to be tracked by a conventional CRL at the BTS 30.

According to the invention, the manner in which the downstream frequency offset is estimated and applied to preemptively offset the CPE upstream IF carrier frequency is identical for each CPE unit 40, 50, 60. Considering the CPE unit 40 for the purpose of example, the downstream frequency offset $\Delta f_{d/s}$ or $\Delta \omega_{d/s}$ can be estimated with the CRL loop 110 following a successful downstream carrier acquisition.

More specifically, as the downstream carrier is acquired, the downstream frequency offset $\Delta \omega_{d/s}$ can be estimated from the delayed phase error $\phi((n-1)T)$ produced at the output of the delay unit 122 which for better accuracy, is preferably averaged for an integer number N of X(nT) samples:

$$\Delta \omega_{d/s} = \frac{1}{N} \sum_{n=1}^{N+(n-1)} \varphi((n-1)T)/T \text{ (radian)}$$

where again, the downstream frequency offset $\Delta \omega_{d/s}$ is expressed in radian. Based on the above expression and the fact that $\Delta \omega_{d/s} = 2\pi \Delta f_{d/s}$ (see above), the downstream frequency offset $\Delta f_{d/s}$ expressed in hertz can be calculated as follows:

$$\Delta f_{d/s} = \frac{1}{N} \sum_{n=1}^{N+(n-1)} \varphi((n-1)T)/(2\pi T) \text{ (Hz)}$$

After the downstream frequency offset $\Delta f_{d/s}$ is estimated as described above, the offset $\Delta f_{d/s}$ is subtracted from the CPE IF carrier frequency $f_{IF3}$ of the IF carrier signal IF3. According to the invention, this has the effect of substantially canceling the upstream frequency offset $\Delta f_{u/s}$ subsequently introduced.

More specifically, referring back to FIG. 2, it will be recalled that the upstream frequency offset $\Delta f_{u/s}$ is introduced as the upstream data originating from the CPE unit 40 is up-converted, transmitted and down-converted at the BTS 30. At the input of the BTS demodulator 90, the IF carrier frequency $f_{IF2}$ of the IF carrier signal IF2 reflects this $\Delta f_{u/s}$ offset as shown in the above expression given above for $f_{IF2}$ reproduced below for convenience:

$$f_{IF2} = f_{u/s} + \Delta f_{u/s}$$

where $f_{u/s} = (f_{LO2} + f_{IF3} - f_{LO1})$ is the nominal or expected upstream IF carrier frequency of the IF carrier signal IF2. By preemptively subtracting $\Delta f_{d/s}$ from $f_{IF3}$, the IF carrier signal frequency $f_{IF2}$ becomes:

$$f_{IF2} = f_{u/s} - \Delta f_{d/s} + \Delta f_{u/s}$$

It will also be recalled that for each CPE unit 40, 50, 60, the downstream carrier frequency offset $\Delta f_{d/s}$ is substantially equal to the upstream carrier frequency offset $\Delta f_{u/s}$ with the result that:

$$f_{IF2} = f_{u/s}$$

As it can be seen from the above, the preemptive offsetting of the CPE upstream IF carrier frequency $f_{IF3}$ can substantially counteract the effect of the upstream frequency offset $\Delta f_{u/s}$ in the upstream data received at the BTS 30.

Figure 4:
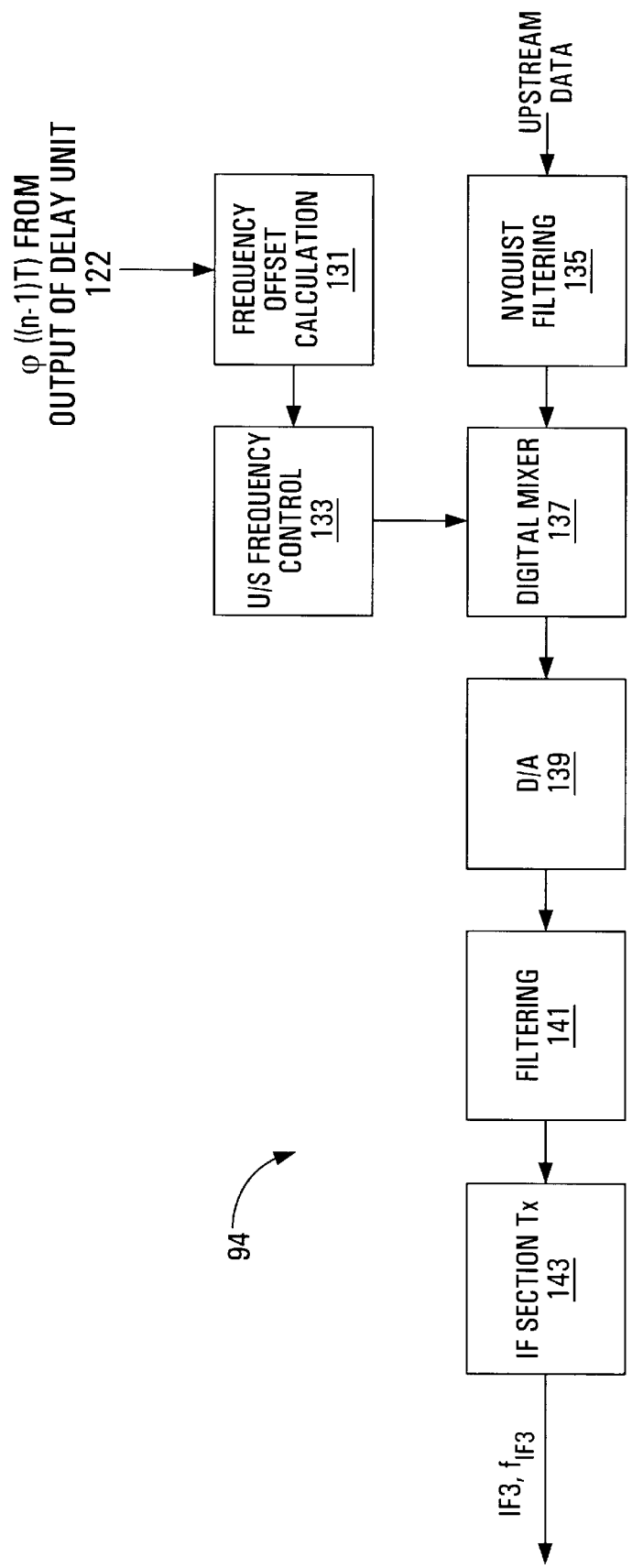
FIG. 4 is a block diagram of the CPE modulator of the CPE unit of FIG. 2 showing in particular an upstream carrier frequency control according to a preferred embodiment of the invention.

To further describe how the upstream carrier frequency control described above can be implemented at the CPE unit 40, reference is now made to FIG. 4. This figure shows the elements necessary for the upstream carrier frequency control implemented as part of the CPE modulator 94. It is to be understood that in addition to the example given in FIG. 4, other implementations are possible. For example, the upstream carrier frequency control elements could alternatively be implemented as part of the CPE demodulator 96. Another alternative is that the elements be implemented as a separate unit internal to the CPE unit 40 but external to both the CPE demodulator 96 and the CPE modulator 94. For the purpose of example, it is assumed that the upstream carrier frequency control elements are implemented as part of the CPE demodulator 94.

As is conventional, upstream data in transmission to the BTS 30 is initially passed through a Nyquist filtering unit 135, a digital mixer 137 and then converted into an analog form by an digital-to-analog (D/A) converter 139. The digitized data is filtered again by another filtering unit 141 in necessary, and then passed to an IF section transmitter 143 which produces the upstream data at the IF carrier signal frequency $f_{IF3}$.

According to the invention, the upstream carrier frequency control is implemented with a frequency offset calculation unit 131 connected in series with an upstream frequency control unit 133. The frequency offset calculation unit 131 is coupled to receive the delayed phase error φ((n−1)T) to determine the downstream frequency offset $\Delta f_{d/s}$ as described above. The downstream frequency offset $\Delta f_{d/s}$ calculated is then passed to the upstream frequency control unit 133. According to the invention, the upstream control unit 133 is operable to preemptively offset the CPE upstream IF carrier frequency $f_{IF3}$ in the digital mixer 137 by an amount corresponding to the downstream frequency offset $\Delta f_{d/s}$ calculated.

Figure 5:
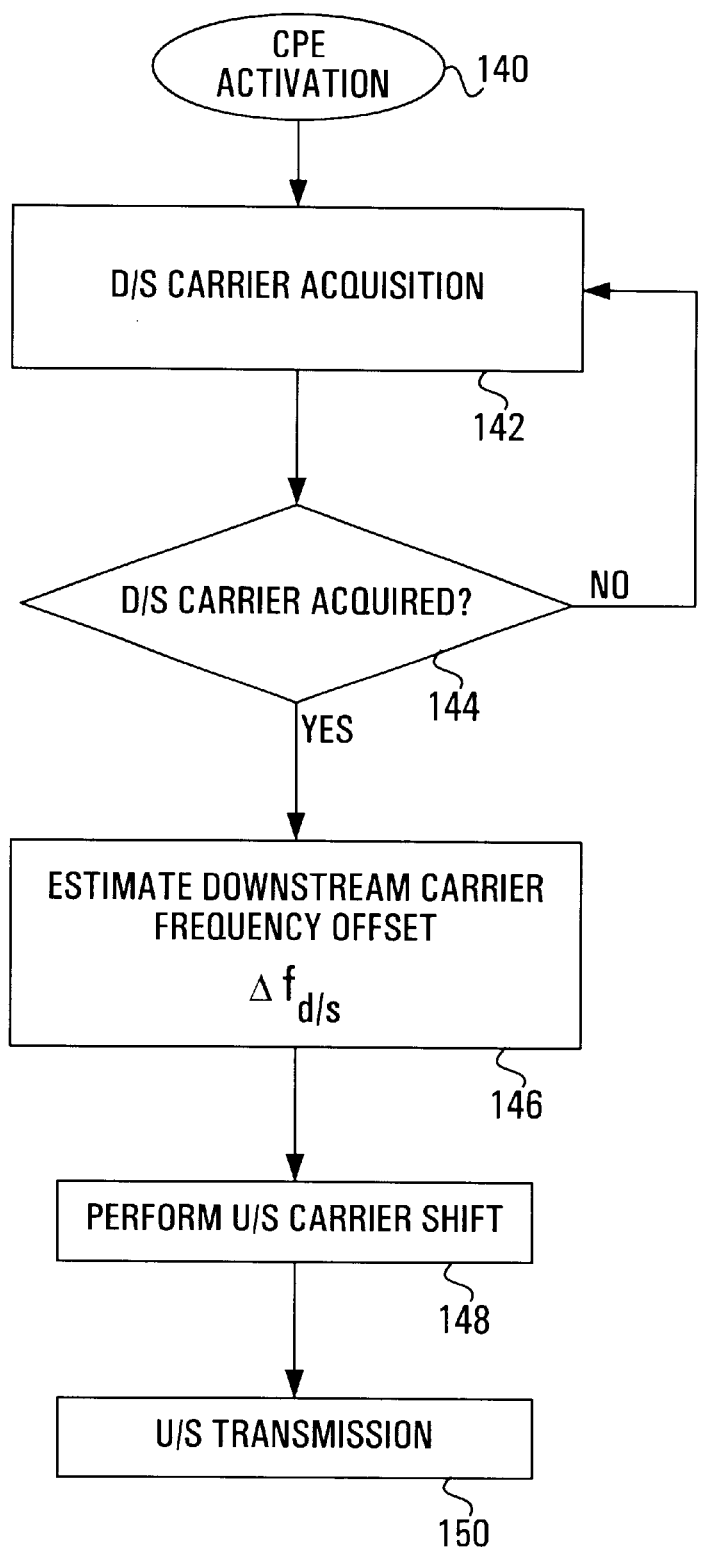
FIG. 5 is a flow chart of the upstream carrier frequency control of FIG. 4.

As noted above, preemptive offsetting of the CPE upstream IF carrier frequency $f_{IF3}$ is carried out after the CPE unit 40 successfully acquires the BTS downstream carrier frequency. FIG. 5 illustrates an example of this in the form of a flow chart. At the top of the flow chart, step 140 denotes the activation of the CPE unit 40. After being activated by for example, a power-up or link reset, the CPE unit 40 initiates the BTS downstream carrier frequency acquisition with the CRL loop 110. Once the BTS downstream carrier frequency has been successfully acquired at step 144, the CPE unit 40 then proceeds to estimate the BTS downstream carrier frequency offset $\Delta f_{d/s}$ and perform some averaging if necessary.

At step 146, the CPE unit 40 operates a preemptive shift of its upstream IF carrier frequency $f_{IF3}$ so that at the BTS 30, the upstream carrier frequency offset $\Delta f_{u/s}$ is substantially eliminated. Once the upstream carrier shift has been performed at step 148, the CPE unit 40 can begin to transmit upstream data as shown at step 150.

According to the invention, the preemptive offsetting of the CPE upstream IF carrier frequency is particularly useful for upstream carrier frequency acquisition at the BTS 30. More specifically, in order for a new CPE unit 40, 50, 60 to initiate contact with the BTS 30, it is extremely important that its CPE upstream carrier frequency be within the BTS carrier acquisition range. Otherwise, the new CPE unit 40, 50, 60 may never be detected or recognized by the BTS 30. According to the invention, the preemptive offsetting of the CPE upstream IF carrier frequency enables new CPE units 40, 50, 60 to establish a nominal upstream link with the BTS 30. This nominal upstream link can then be used for example to initiate further synchronization or ranging with the BTS 30.

According to another important aspect, the invention is also be used to control the BTS downstream carrier frequency and thus improve carrier acquisition performance at the CPE units 40, 50, 60. More specifically, to improve downstream carrier acquisition performance, the BTS 30 periodically polls all active CPE units 40, 50, 60 present in the BWA TDMA network 10 to obtain downstream frequency offset estimates. In each polling period, a frequency correction offset for the next polling period is calculated based on the downstream frequency offset estimates received. For the next polling period, the BTS 30 then shifts the IF carrier frequency $f_{LO1}$ of the local oscillator 86 (see FIG. 2) according to the frequency correction offset calculated.

According to the invention, this IF carrier shift is periodically carried out at the BTS 30 to compensate for downstream carrier frequency variations caused by the local oscillator 86 and therefore to improve downstream carrier acquisition. Assuming for the purpose of example that $\Delta f_m(n)$ is a downstream frequency offset estimate obtained from CPE m at time instant n, then a frequency correction offset $\Delta f_{LO1}(n)$ can be calculated as follows:

$$\Delta f_{LO1}(n) = \alpha \cdot \frac{1}{2M} \sum_{m=1}^{M} \Delta f_m(n)$$

where M is the total number of CPE units 40, 50, 60 active in the BWA TDMA network 10 and α is a scaling factor which, depending on the number of active CPE units 40, 50, 60 is selected in the range of 0 to 1. For a large number of CPE units 40, 50, 60, α is preferably be selected close to 1. For a small number of CPE units 40, 50, 60, α is preferably selected close to 0.

The frequency correction offset $\Delta f_{LO1}(n)$ represents a an estimate of the carrier frequency drift introduced by the local oscillator 86 (see FIG. 2). Therefore, shifting the BTS IF downstream carrier frequency $f_{LO1}$ by an amount corresponding to the frequency correction offset $\Delta f_{LO1}(n)$ provides an efficient compensation for the downstream carrier frequency variations caused by the local oscillator 86. This in turn improves downstream carrier acquisition performance at the CPE units 40, 50, 60.

According to the invention, the frequency at which the CPE units 40, 50, 60 are polled and the BTS IF carrier frequency $f_{LO1}$ compensated will normally depend on the frequency drift rate of the network 10. A typical frequency drift rate for a wireless system can be in the order of minutes or hours in some cases. Therefore, polling the CPE units 40, 50, 60 at these relatively slow rates does not add any significant overhead to the system.

In the preferred embodiment, the frequency correction offset $\Delta f_{LO1}(n)$ calculated during each polling period is implemented incrementally over the next polling period. Preferably, the maximum incremental correction will be such that the corresponding phase change during one downstream symbol period will be less than 1 degree. As an example, for a one megahertz (MHz) downstream symbol rate, this translates to approximately 2.8 KHz increments.

Figure 6:
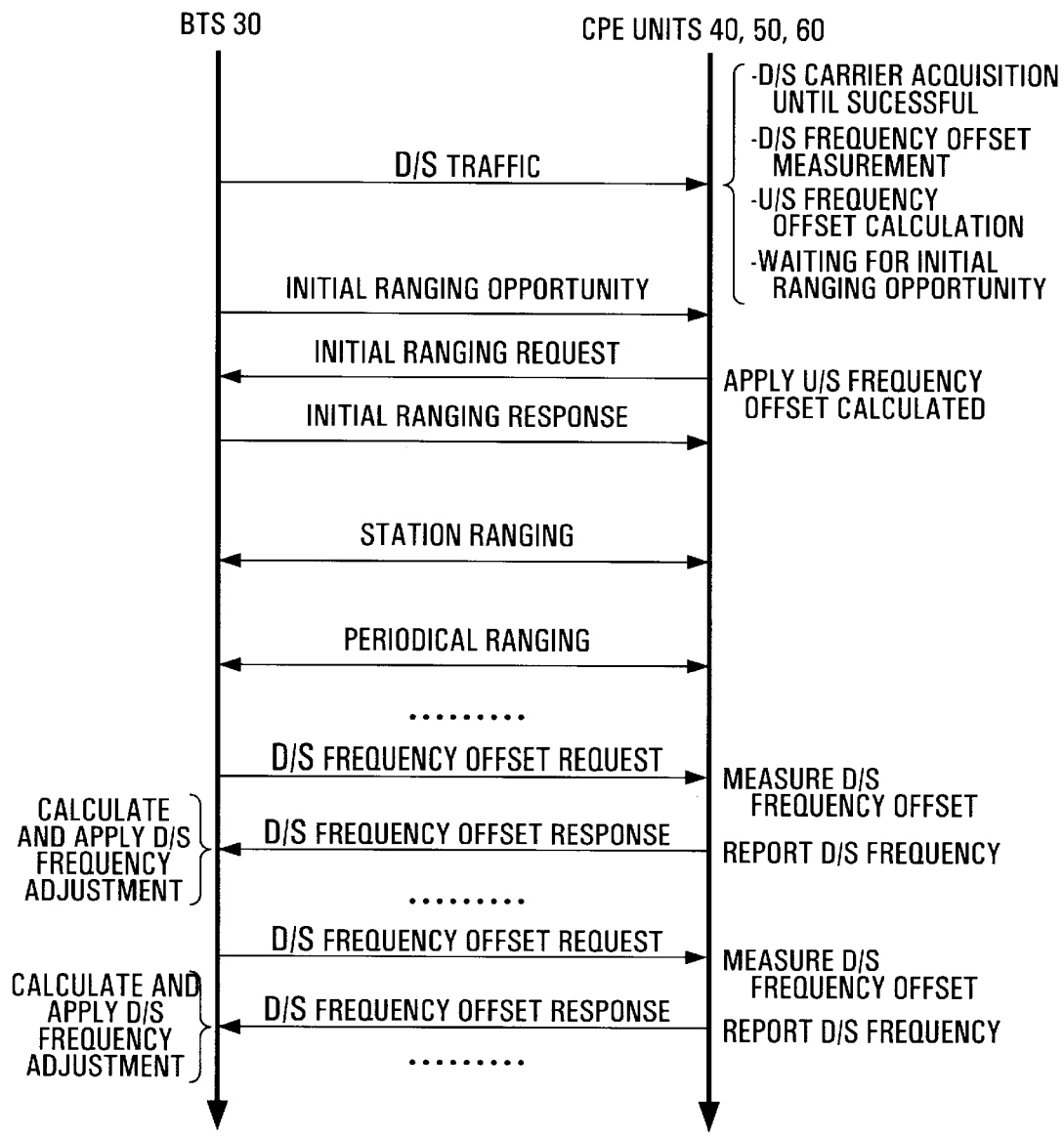
FIG. 6 is a diagram illustrating an international telecommunications union (ITU) R112 local multipoint distribution service (LMDS) protocol ranging process used in the BWA TDMA network of FIG. 1 which incorporates an upstream and downstream carrier frequency control according to the preferred embodiment of the invention.

The upstream and downstream carrier compensation scheme described above can be used in the context of various wireless synchronization or ranging protocols including for example, the international telecommunications union (ITU) R112 local multipoint distribution service (IMDS) protocol (hereinafter the "R112 protocol"). For the purpose of example, FIG. 6 shows how the upstream and downstream frequency mechanism of the present invention can be implemented with the R112 protocol.

According to the R112 protocol, the BTS 30 runs periodical checks to see if there is any new CPE unit 40, 50, 60 which has been powered up and is about to join the BWA TDMA network 10. For this, the BTS provides ranging opportunities for new CPE units 40, 50, 60, to join the BWA TDMA network 10. When the BTS 30 receives an initial ranging request from a new CPE unit 40, 50, 60, the BTS 30 initiates a ranging process to synchronize the new PCE unit 40, 50, 60 with the BTS 30. This ranging process which is shown in FIG. 6 consists of an initial ranging procedure, a station ranging procedure and a periodic ranging procedure. In each procedure, messages are exchanged between the new CPE unit 40, 50, 60 and the BTS 30 to carry out the synchronization (messages exchanged in the station ranging procedure and periodic ranging procedure not shown).

When a new CPE unit 40, 50, 60 is activated, the new CPE unit 40, 50, 60 initiates acquisition of the downstream carrier frequency. Following successful acquisition of the downstream carrier frequency, the new CPE unit 40, 50, 60 estimates the BTS downstream carrier frequency offset. Based on the BTS downstream carrier frequency offset estimated, the new CPE unit 40, 50, 60 calculates an upstream IF carrier frequency offset as described above and waits to receive an initial ranging opportunity from the BTS 30. When an initial ranging opportunity is received, the new CPE unit 40, 50, 60 applies the upstream IF carrier frequency offset calculated and sends an initial ranging request to the BTS 30. The BTS 30 then responds by requesting the new CPE unit 40, 50, 60 to nominally adjust its local timing base, upstream carrier frequency and upstream transmit power for TDMA operations over the upstream radio link 14.

After this initial station ranging procedure, the BTS 30 enters into the station ranging procedure to further adjust the CPE local timing base, upstream carrier frequency and transmit power. As is well known, the station ranging procedure is a fine adjustment procedure that may be repeated many times if necessary. Once completely synchronized with the BTS 30, the new CPE unit 40, 50, 60 can begin to transmit upstream data to the BTS 30. If necessary, the BTS 30 can also periodically enter into the periodic ranging procedure to periodically adjust of the TDMA timing, upstream carrier frequency and transmit power of the newly synchronized CPE unit 40, 50, 60 whenever required.

As mentioned above, to improve downstream carrier acquisition performance, the BTS 30 can periodically poll all of the active (and synchronized) CPE units 40, 50, 60 present in the BWA TDMA network 10 to obtain downstream frequency offset estimates. The active CPE units 40, 50, 60 will respond by each reporting a particular downstream frequency offset estimate to the BTS 30. Based on all of the downstream frequency estimates received, the BTS 30 then calculates a frequency correction offset and shifts the IF carrier frequency $f_{LO1}$ of the local oscillator 86 (see FIG. 2) according to the frequency correction offset calculated.

While the invention has been described above with reference to a particular wireless network, further modifications and improvements to implement the invention in other types of wireless networks and systems which will occur to those skilled in the art, may be made within the purview of the appended claims, without departing from the scope of the invention in its broader aspect.

In particular, the invention has been described in relation to a BWA TDMA network. It is to be understood that the invention is also applicable to other types of BWA networks. Generally, the invention can be used in any wireless network or system to control the carrier frequency of any signal transmitted from a transmitting terminal to a receiving terminal.

Considering the upstream carrier frequency control in particular, the downstream frequency offset $\Delta f_{d/s}$ has been described as being subtracted from the CPE IF carrier frequency to cancel the upstream frequency offset $\Delta f_{u/s}$ subsequently introduced. It is to be understood that depending on the particular configuration of the CPE units, the downstream frequency offset $\Delta f_{d/s}$ could be applied in a different manner to counteract the upstream frequency offset $\Delta f_{u/s}$. For example, the downstream frequency offset $\Delta f_{d/s}$ could alternatively be added to the CPE IF carrier frequency to counteract the upstream frequency offset $\Delta f_{u/s}$.

Further, the upstream frequency offset has been described above as being applied to the digital mixer within the CPE modulator. It is to be understood that alternatives are possible. For example, the upstream frequency offset could alternatively be applied in the IF section transmitter. More generally, the upstream frequency offset could be applied anywhere along the upstream transmit path (e.g. within the CPE demodulator) prior to any up-conversion of the upstream data from IF to RF.

We claim:

1. A method of providing a carrier frequency control in a wireless communications network for at least one first signal respectively produced for transmission in at least one first station at a first carrier frequency and transmitted from the at least one first station to a second station having a defined carrier frequency acquisition range, the method comprising:

receiving in each of the at least one first station a second signal transmitted from the second station;

producing in each of the at least one first station the second signal received at a respective second carrier frequency;

estimating in each of the at least one first station a respective carrier frequency offset between the corresponding second carrier frequency and an expected carrier frequency;

preemptively shifting in each of the at least one first station the first carrier frequency based on the respective carrier frequency offset estimated for maintaining the first signal within the defined carrier acquisition range of the second station;

at the second station, polling the at least one first station to request carrier frequency offset estimates;

at each of the at least one first station where a poll request is received, reporting the respective carrier frequency offset estimate to the second station;

at the second station, receiving the respective carrier frequency offset estimates reported;

based on the carrier frequency offset estimates received, calculating in the second station a frequency adjustment; and applying in the second station the frequency adjustment calculated to shift a third carrier frequency at which the second signal is produced so as to minimize carrier frequency variations in the second signal.

2. The method of claim 1 wherein estimating in each of the at least one first station a respective carrier frequency offset between the corresponding second carrier frequency and an expected carrier frequency comprises in each of the at least one first station:

digitizing the second signal received to produce digital samples of the second signal;

acquiring the second carrier frequency; and estimating the corresponding carrier frequency offset between the acquired second carrier frequency and the expected carrier frequency.

3. The method of claim 2 wherein acquiring the second carrier frequency in each of the at least one first station is done with a respective frequency sweep carrier recovery loop (CRL).

4. The method of claim 1 wherein preemptively shifting in each of the at least one first station the first carrier frequency based on the respective carrier frequency offset estimated comprises in each of the at least one first station subtracting the respective carrier frequency offset estimated from the corresponding first carrier frequency so as to maintain the first carrier frequency within the defined carrier acquisition range of the second station.

5. The method of claim 1 wherein the first and second carrier frequencies are intermediate carrier frequencies.

6. The method of claim 5 further comprising in each of the at least one first station up-converting the respective first signal from the corresponding preemptively shifted first intermediate carrier frequency to a first radio carrier frequency for transmission to the second station.

7. The method of claim 6 wherein receiving in each of the at least one first station a second signal transmitted from the second station comprises receiving in each of the at least one first station the second signal at a second radio carrier frequency, and wherein producing in each of the at least one first station the second signal received at a respective second carrier frequency comprises down-converting in each of the at least one first station the second signal received from the second radio carrier frequency to the respective second intermediate carrier frequency.

8. The method of claim 7 wherein a single local oscillator is used in each of the at least one first stations for up-converting the respective first signal and for down-converting the second signal.

9. The method of claim 8 wherein prior to being transmitted to the at least one first station, the second signal is up-converted in the second station from the third carrier frequency to the second radio carrier frequency, the method further comprising:

receiving in the second station the at least one first signal transmitted at the first radio carrier frequency; and down-converting in the second station the at least one first signal received from the first radio carrier frequency to a fourth intermediate carrier frequency.

10. The method of claim 9 wherein a single local oscillator is used in the second station for up-converting the second signal and for down-converting the plurality of first signals received.

11. The method of claim 1 wherein applying in the second station the frequency adjustment calculated is done to facilitate carrier acquisition of the second signal at each of the at least one first station.

12. The method of claim 1 wherein the second station is a base transceiver station, each of the at least one first station is a customer premises equipment unit, and wherein the first and the second signals are upstream and downstream signals respectively.

13. The method of claim 1 wherein the wireless communication network is a broadband wireless access (BWA) time division multiple access (TDMA) network.

14. The method of claim 1 wherein for polling the at least one first station to obtain carrier frequency offset estimates, messages are exchanged between the second station and each of the at least one first station based on the international telecommunications union (ITU) R112 local multipoint distribution service (LMDS) protocol.

* * * * *